United States Patent
Buslaev (10) Patent No.: US 11,593,593 B2
(45) Date of Patent: *Feb. 28, 2023

(54) LOW POWER CONSUMPTION DEEP NEURAL NETWORK FOR SIMULTANEOUS OBJECT DETECTION AND SEMANTIC SEGMENTATION IN IMAGES ON A MOBILE COMPUTING DEVICE

(71) Applicant: Mapbox, Inc., San Francisco, CA (US)

(72) Inventor: Aleksandr Buslaev, Minsk (BY)

(73) Assignee: Mapbox, Inc., San Francisco, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/224,965

(22) Filed: Apr. 7, 2021

(65) Prior Publication Data

US 2021/0224608 A1 Jul. 22, 2021

Related U.S. Application Data

(63) Continuation of application No. 16/354,108, filed on Mar. 14, 2019, now Pat. No. 11,010,641.

(51) Int. Cl.
*G06K 9/62* (2022.01)

(52) U.S. Cl.
CPC .................. *G06K 9/6262* (2013.01)

(58) Field of Classification Search
CPC .. G06V 10/776; G06V 10/778; G06V 10/809; G06V 20/56; G06V 20/58; G06V 20/582; G06V 20/584; G06K 9/6262; G06K 9/6292; G06T 2207/20084; G06T 2207/30252; G06T 2207/30261; G06N 3/02; G06N 3/04; G06N 3/0445; G06N 3/0454

See application file for complete search history.

(56) References Cited

U.S. PATENT DOCUMENTS

| | | | | |
|---|---|---|---|---|
| 10,300,851 B1 * | 5/2019 | Kim et al. | ............ | G06K 9/00 |
| 2010/0295948 A1 | 11/2010 | Xie et al. | ............ | 348/175 |
| 2011/0115912 A1 | 5/2011 | Kuehnle | | |
| 2018/0306590 A1 * | 10/2018 | Li | ............ | G06F 16/00 |
| 2018/0322648 A1 | 11/2018 | Lu et al. | ............ | G06T 7/593 |
| 2018/0336424 A1 * | 11/2018 | Jang et al. | ............ | G06V 20/41 |
| 2018/0357509 A1 | 12/2018 | Dlugosz et al. | ..... | G06K 9/6211 |
| 2018/0357791 A1 | 12/2018 | Dworakowski et al. | | G06T 7/80 |
| 2018/0365858 A1 | 12/2018 | Kim et al. | | |
| 2019/0042883 A1 * | 2/2019 | Park et al. | ............ | G06V 20/64 |
| 2019/0050681 A1 * | 2/2019 | Tate | ............ | G06T 7/70 |
| 2019/0147622 A1 | 5/2019 | Li et al. | ............ | G06T 7/80 |
| 2019/0266752 A1 | 8/2019 | Dlugosz et al. | ............ | G06T 7/80 |
| 2020/0082178 A1 | 3/2020 | Ahn et al. | | |
| 2020/0104607 A1 | 4/2020 | Kim et al. | | |
| 2020/0242391 A1 | 7/2020 | Takahashi | ............ | G06K 9/4604 |
| 2020/0257930 A1 * | 8/2020 | Nahr | ............ | G06V 10/454 |
| 2021/0310807 A1 | 10/2021 | Demir et al. | ............ | G01C 13/008 |

OTHER PUBLICATIONS

He et al., "Deep Residual Learning for Image Recognition", 2016 IEEE Conference on Computer Vision and Pattern Recognition, pp. 770-778, 2016. (Year: 2016).*
Chaurasia et al., "LinkNet: Exploiting Encoder Representations for Efficient Semantic Segmentation", Microsoft Research, 5 pages, Jun. 2017. (Year: 2017).*
United States Patent Office, U.S. Appl. No. 16/566,831, filed Jun. 24, 2021, 14 pages.

* cited by examiner

*Primary Examiner* — Andrew W Johns
(74) *Attorney, Agent, or Firm* — Fenwick & West LLP (57) ABSTRACT

A mobile computing device receives an image from a camera physically located within a vehicle. The mobile computing device inputs the image into a convolutional model that generates a set of object detections and a set of segmented environment blocks in the image. The convolutional model includes subsets of encoding and decoding layers, as well as parameters associated with the layers. The convolutional model relates the image and parameters to the sets of object detections and segmented environment blocks. A server that stores object detections and segmented environment blocks is updated with the sets of object detections and segmented environment blocks detected in the image.

20 Claims, 11 Drawing Sheets

LOW POWER CONSUMPTION DEEP NEURAL NETWORK FOR SIMULTANEOUS OBJECT DETECTION AND SEMANTIC SEGMENTATION IN IMAGES ON A MOBILE COMPUTING DEVICE

CROSS REFERENCE TO RELATED APPLICATIONS

This application is a continuation of prior, co-pending U.S. application Ser. No. 16/354,108, filed on Mar. 14, 2019, which is incorporated herein by reference in its entirety for all purposes.

FIELD OF ART

This description relates to image processing and object detection in images, and particularly to deep neural networks running on mobile computing devices in power and processing limited environments.

BACKGROUND

Digital electronic maps are widely used today for navigation, ride sharing, and video games, among other uses. While stand-alone mapping applications often include many of these functionalities, other applications can make use of electronic maps by calling a map server through an Application Programming Interface (API) on computing devices. Running the mapping applications or mapping APIs on mobile computing devices especially can consume immense bandwidth, processing and battery power. This is especially true for mapping applications that attempt to process camera images in real time. As a result, there is a need not only for mapping applications generally, but mapping applications that can function in low power/low computer processing power environments.

SUMMARY

A method for detecting objects and segmented environmental blocks on a mobile computing device is disclosed herein. The mobile computing device receives an image from a camera physically located within a vehicle. The mobile computing device inputs the image into a convolution model loaded into a memory of the mobile computing device. The convolution model is configured to generate a set of object detections for objects appearing in the received image and a set of segmented environment blocks. The convolution model includes a plurality of parameters associated with a plurality of layers of the convolution model. The layers include a subset of encoding layers and a subset of decoding layers, and at least one skip connection between the encoding layers and the decoding layers. The subset of decoding layers includes a first set of paired detector block heads for generating object detections of a large size, a first linknet block and a second set of paired detector head blocks for generating object detections of a medium size, a second linknet block and a third set of paired detector head blocks for generating object detections of a small size, and a third linknet block and at least one up-sampling layer to generate the set of segmented environment blocks. The convolution model also includes a function relating the image and the parameters to the set of object detections and the set of segmented environment blocks. The mobile computing device provides the set of object detections and the set of segmented environment blocks to a server computing device.

DETAILED DESCRIPTION

I. System Environment & Architecture

Figure 1:
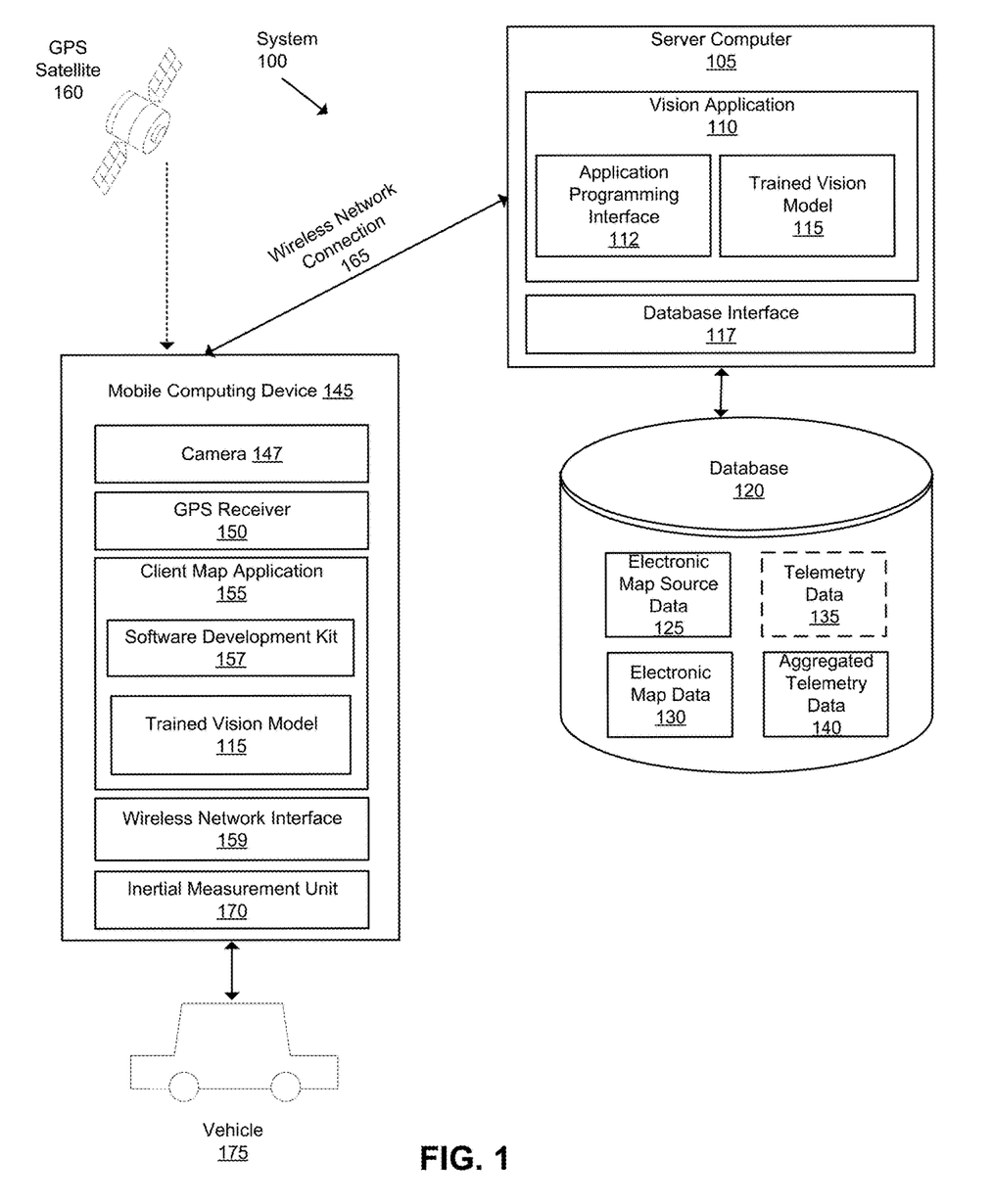
FIG. 1 illustrates an example computer system in which the techniques described may be practiced, according to one embodiment.

FIG. 1 illustrates an example computer system in which the techniques described may be practiced, according to one embodiment.

A computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a vision application 110, an application programming interface (API) 112, a trained vision model 115, and a database interface 117. The database 120 comprises electronic map source data 125, electronic map data 130, telemetry data 135, and aggregated telemetry data 140. The mobile computing device 145 comprises a camera 147, a GPS receiver 150, a client map application 155, a wireless network interface 159, and an inertial measurement unit 170. The client map application 155 includes the trained vision model 115 and a software development kit (SDK) 157. The client map application 155 is hosted by the mobile computing device 145, and runs the trained vision model 115. The client map application 155 and/or the vision application 110 use the output of trained vision model 115 in a number of ways, as discussed in the following sections.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute vision application 110, and may include other applications, software, and other executable instructions, such as database interface 117, to facilitate various aspects of embodiments described herein.

Database interface 117 is a programmatic interface such as JDBC or ODBC for communicating with database 120. Database interface 117 may communicate with any number of databases and any type of database, in any format. Database interface 117 may be a piece of custom software created by an entity associated with the vision application 110, or may be created by a third party entity in part or in whole.

Database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

Electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

Electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

Telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

Aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

Mobile computing device 145 is any mobile computing device, such as a laptop computer, hand-held computer, wearable computer, cellular or mobile phone, portable digital assistant (PDA), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS receiver 150. GPS receiver 150 is a receiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device.

Mobile computing device 145 also includes a camera device 147. The camera 147 may be external, but connected, to the mobile computing device 145. Alternatively, the camera 147 may be an integrated component of the mobile computing device 145. Camera 147 functionality may include the capturing of infrared and visible light.

Mobile computing device 145 may include a client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

The trained vision model 115 receives images from the camera 147. In one embodiment, the client map application 155 may also receive processed images from the trained vision model 115. In one embodiment, the trained vision model 115 is configured to output sets of detected objects and segmented environment blocks. As discussed below, the trained vision model 115 may have other outputs, such as lane estimations.

In server computer 105, the vision application 110 provides the API 112 that may be accessed, for example, by client map application 155 using SDK 157 to provide electronic mapping to client map application 155. Specifically, the vision application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein.

II. Operating Environment for Use of the Trained Vision Model

Figure 2:
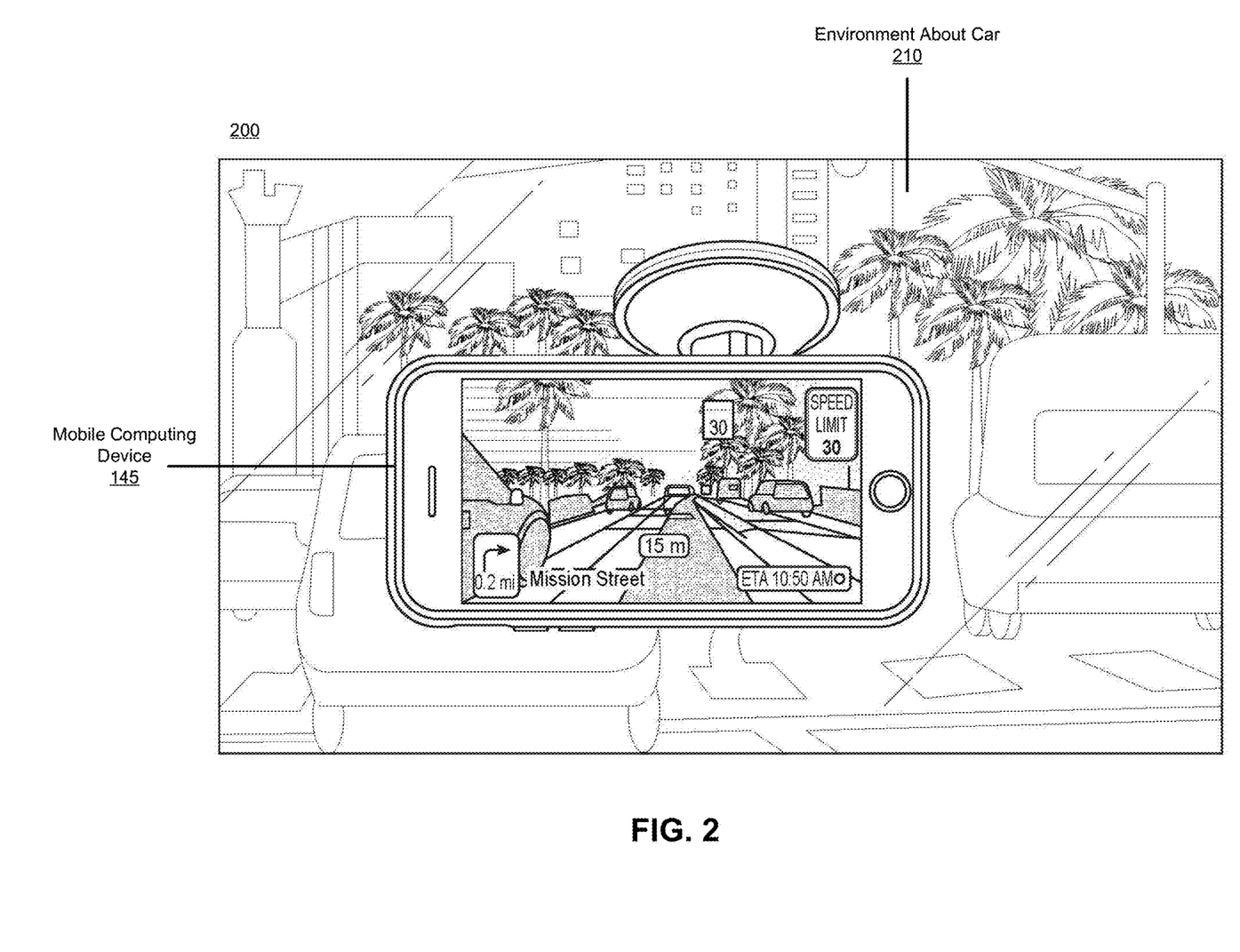
FIG. 2 shows an example environment of the context in which a trained vision model may be used, according to one embodiment.

As shown in FIG. 1, the trained vision model 115 is hosted by a mobile computing device 145 within a vehicle 175. FIG. 2 shows an example environment of the context in which a trained vision model may be used, according to one embodiment. Generally, the mobile computing device 145 will be mounted within the vehicle, for example on the vehicle's windshield or on its dashboard. The mobile computing device's camera's 147 field of view would be of the environment about the vehicle 210, where images (frames) captured by the camera are input into the trained vision model 115. In one embodiment, after processing by the trained vision model 115, the live camera view or some processed view thereof would be displayed on the mobile computing device screen for the user's view. In the same or a different embodiment, computer code associated with a software application loaded on the mobile computing device 145 (e.g., the client map application 155) alerts the user regarding objects and environmental aspects detected in the captured images, examples of which include but are not limited to road signs, driving directions, and current location information. In the same or a different embodiment, the output of the trained vision model 115 is used to provide new or updated map information to the server 105, including locations of road signs, car lane information, etc. In the same or a different embodiment, the output of the trained vision model 115 is used to calibrate the trained vision model 115 to accommodate the current positioning of the mobile computing device 145 in the vehicle 175.

III. Trained Vision Model Output

Figure 3:
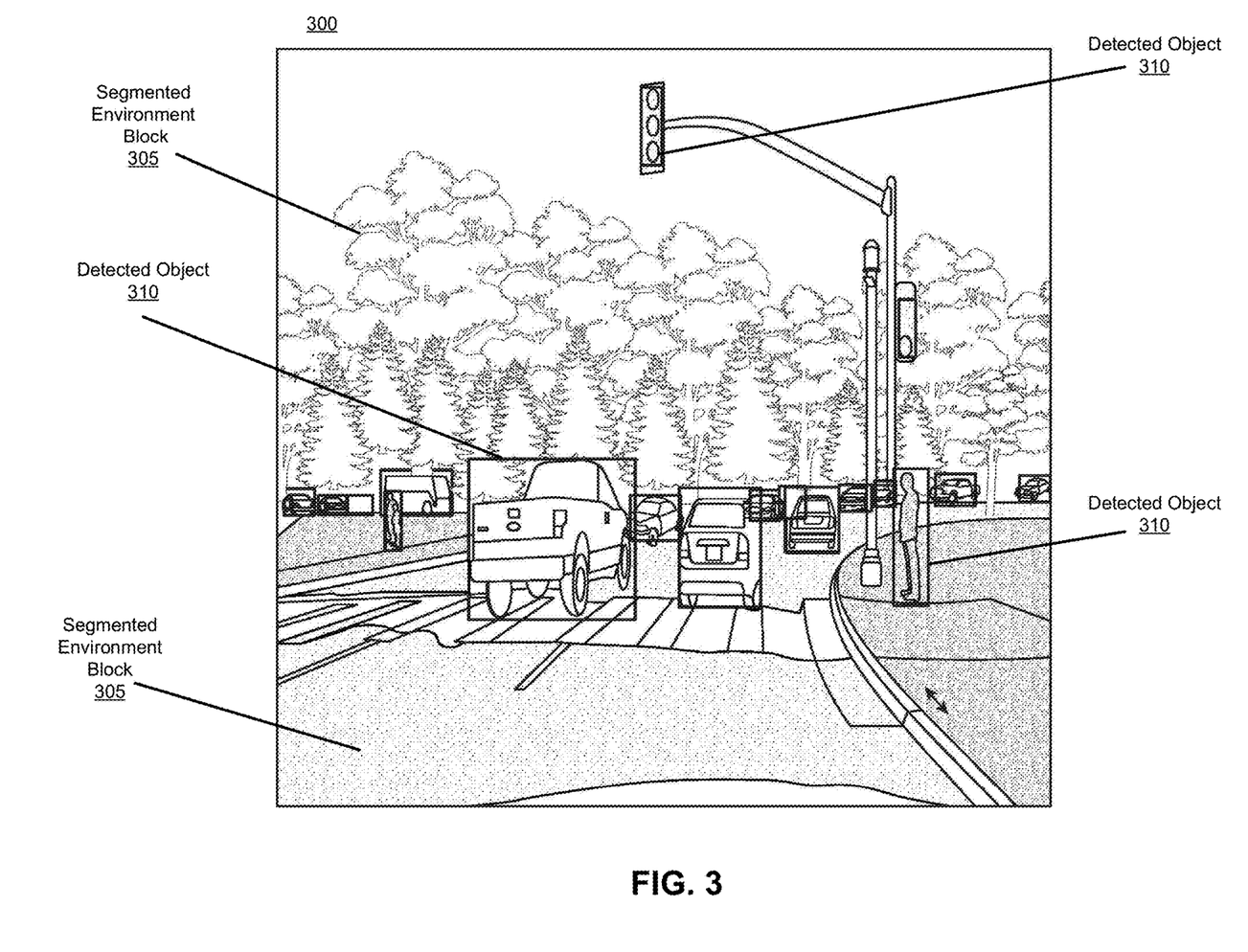
FIG. 3 shows an example of a processed image processed by the vision model in which objects are detected and the image's pixels are segmented.

FIG. 3 shows an example of a processed image processed by the vision model in which objects are detected and the image's pixels are segmented. The trained vision model 115 includes a neural net that processes each frame of the live camera view of the mobile computing device 145 and then generates two groups of outputs: 1) a set of segmented environment blocks 305, and 2) a set of detected objects 310. A segmented environment block 305 may be represented in memory of the mobile computing device by the set of pixels in the live camera image associated with the block. Detected objects may be represented similarly or they may be represented by the size and location (e.g., origin) of a bounding box within each image. Both groups can further include several different types of blocks/objects.

Segmented environment blocks 305 generally include unbounded shapes that intersect, cross, or pass behind detected objects or other segmented environment blocks. Examples of types of segmented environment blocks may include background or foreground foliage, the sky/horizon, roads and their respective lanes, sidewalks, and so on, as depicted in FIG. 3.

Detected objects 310 include discrete shapes around which bounding boxes can be placed. Examples of types of detected objects may include pedestrians, bike riders, vehicles, road signs, traffic lights, and so on, as depicted in FIG. 3. Generally, types of detected objects 310 are not types of segmented environment blocks, and vice versa.

IV. Training and Inference with the Vision Model

Figure 4A:
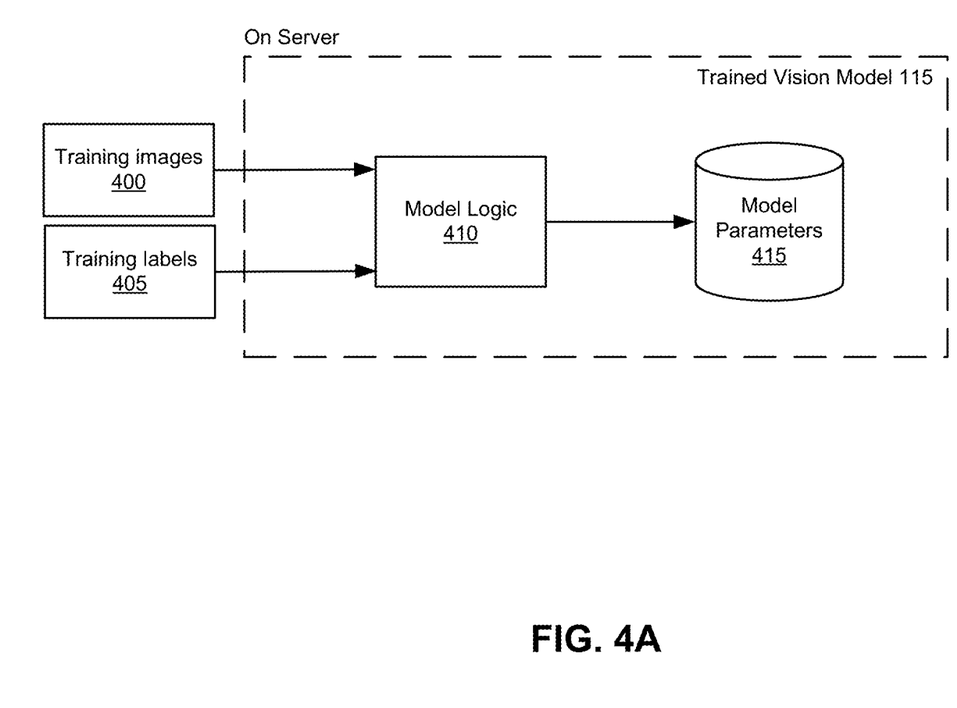
FIG. 4A is a flowchart for training the vision model, according to one embodiment.

FIG. 4A is a flowchart for training the trained vision model 115, according to one embodiment. On the server 105, a set of training images 400 and an associated set of training labels 405 are input into the vision model 115. The training images 400 and labels 405 are used in conjunction with model logic 410 to determine a set of model parameters 415 that, once determined, are stored. The model logic 410 includes at least a function relating the model parameters 415 and an image input into the model to a set of outputs. The model logic 410 generally also includes a loss function or other model training information that determines how the model parameters 415 are to be trained using the set of training images and labels. The exact function, loss function, and outputs of the trained vision model 115 may vary by implementation. One embodiment of a particular trained vision model 115 architecture is discussed further below with the respect to FIG. 5.

Figure 4B:
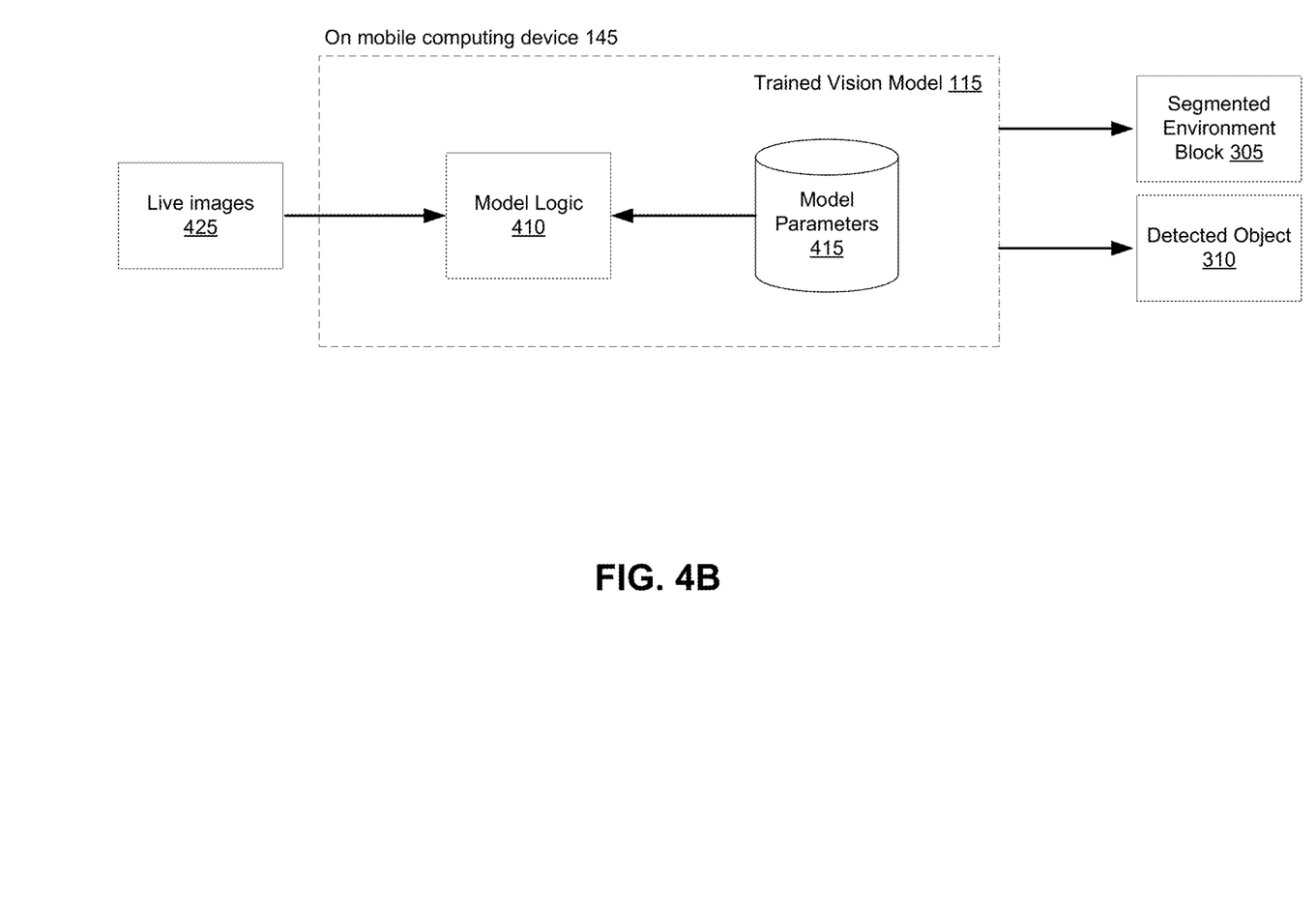
FIG. 4B is a flowchart for using the trained vision model on live images captured by a mobile computing device, according to one embodiment.

FIG. 4B is a flowchart for using the trained vision model on live images captured by a mobile computing device 145, according to one embodiment. As discussed above, a common use case for the trained vision model 115 assumes storage and loading of the trained vision model 115 in memory of the mobile computing device 145. On the mobile computing device 145, live images 425 from the camera 147 are input into the trained vision model 115, more specifically model logic 410. The model logic 410 of the trained vision model 115 accesses the stored model parameters 415. The model logic 410 uses to the model parameters 415 and live camera images 425 to determine model outputs, e.g., segmented environment blocks 305 and detected objects 310, examples of which are illustrated in FIG. 3.

Figure 6:
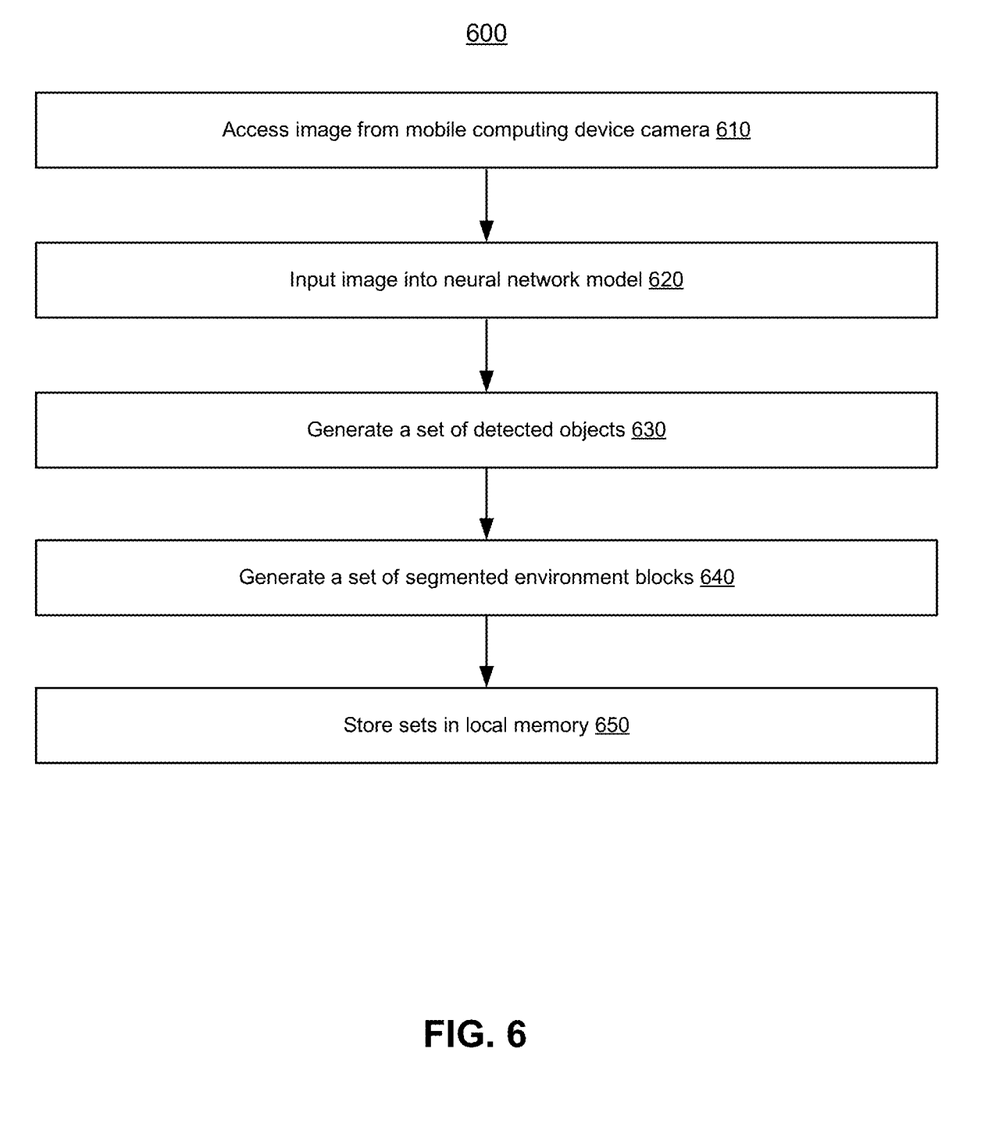
FIG. 6 is a flowchart for using the trained vision model to detect objects and segment environment blocks on a captured image, according to one embodiment.

FIG. 6 is a flowchart 600 showing the sequence of events that the client map application 155 follows to output segmented environment blocks 305 and detected objects 310 on a captured image, as discussed in the description of FIG. 3. The client map application 155 accesses 610 live images 425 taken from the camera of the mobile computing device 145, e.g. a phone in one embodiment. The client map application 155 inputs the live images 425 into a neural network model, e.g., the trained vision model 115. The neural network model (e.g., the trained vision model 115) generates 630 a set of detected objects and generates 640 a set of segmented environment blocks. The client map application 155 stores 650 the sets of detected object and segmented environmental blocks in the mobile computing device's local memory. In one embodiment, the image along with the sets of detected objects and segmented environment blocks are added to the training images 400 and training labels 405 that are used to train the vision model 115. In another embodiment, the mobile computing device 145 displays the segmented environment blocks 305 and detected objects 310.

V. Example Vision Model Architecture

Although there are a number of model architectures that may function adequately for performing detection and image segmentation tasks on a set of images, generally these model architectures are designed for use with traditional desktop or cloud computing resources, both in terms of processor computation ability, and also in that they have wired connection to electrical power. Mobile computing devices, by contrast, are limited in both regards. As such, model architectures that require a great deal of electrical power or compute ability are infeasible for use with mobile computing devices.

Particularly in this context, the goal of the trained vision model 115 is to run continuously on the mobile computing device 145 as a driver operates a vehicle traveling from one destination to another, while consuming as little compute ability and power as possible, while also achieving desired object detection and segmentation on the images processed by the trained vision model 115. The embodiments described herein are specifically designed to meet these competing goals.

In some embodiments, the trained vision model 115 is a convolution neural network. The convolution neural network may be implemented using a RetinaNet. A RetinaNet uses a single-stage detector with focal loss for detecting rare classes. Single-stage detectors use anchor boxes, which are previously selected bounding boxes representing proposals for various sizes and shapes of objects in the image. Each pixel position in the image may have multiple bounding boxes, from which the RetinaNet selects the best fitting bounding box for given objects in the training images. Each pixel position is provided to a classification head and a regression head. During the prediction phase, the RetinaNet uses the regression head to determine boundaries of detected objects for each anchor box for each pixel position. The boundaries include position (e.g., x/y position) and size (e.g., width and height). The RetinaNet uses the classification head to predict the probability of an object for each anchor box for each pixel position (e.g., a probability for each class representing a type of object, or a probability of no object). The RetinaNet uses focal loss, which adds a factor to the standard cross entropy criterion of convolution neural networks. The focal loss reduces the relative loss for well-classified examples and puts more focus during training on hard, misclassified examples. Using focal loss provides improved accuracy over two-stage detectors and the speed of single-stage detectors. RetinaNets and focal loss are described in further detail in "Focal Loss for Dense Object Detection" by Tsung-Yi Lin, Priya Goyal, Ross Girshick, Kaiming He, and Piotr Dollár.

Figure 5:
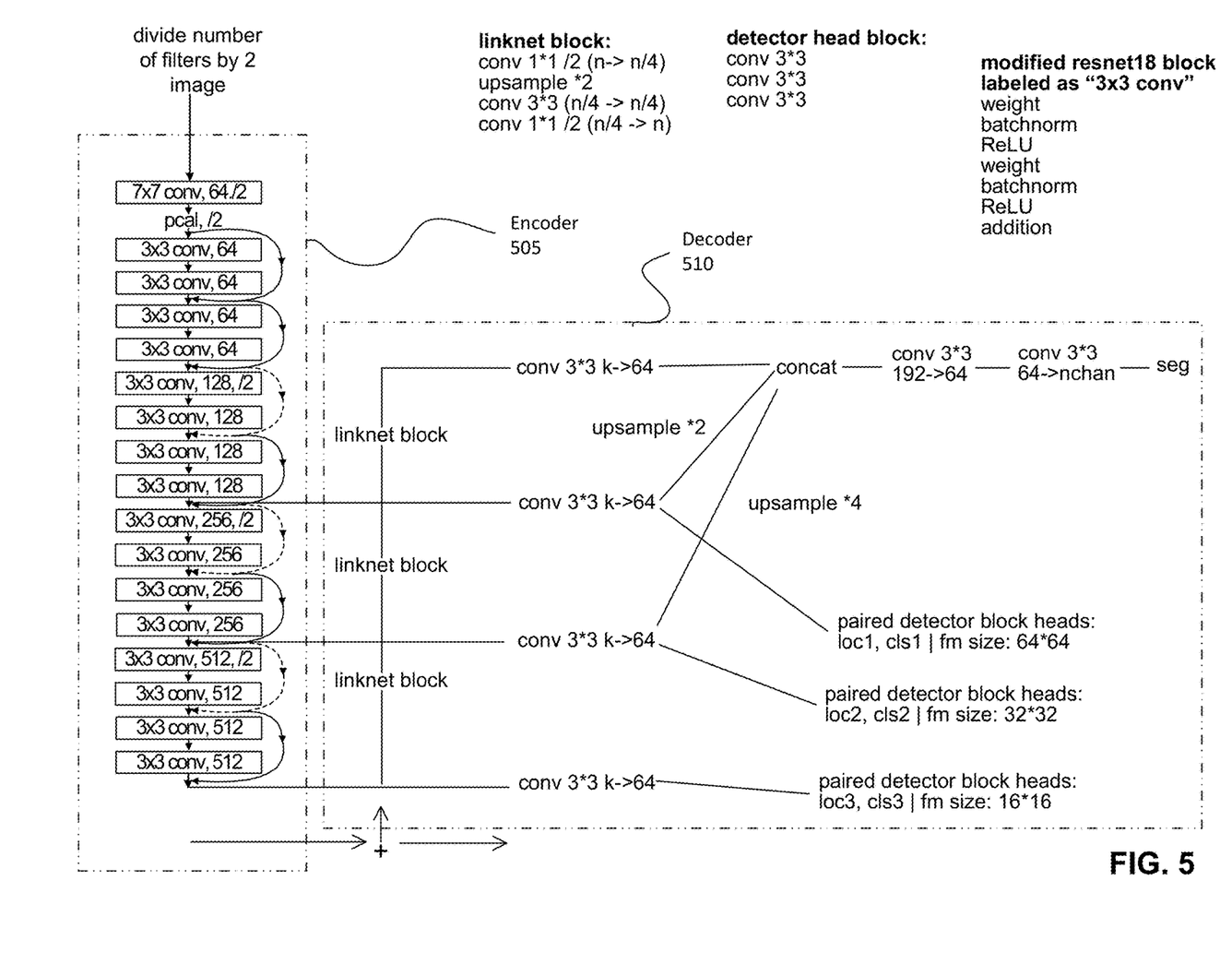
FIG. 5 is a flowchart illustrating the architecture of the neural network of the vision model, according to one embodiment.

FIG. 5 is a flowchart of an example architecture of a convolution neural network that makes up the trained vision model 115, according to one embodiment. In the example embodiment of FIG. 5, the architecture is generally structured as neural network model. In a specific embodiment, the neural network is specifically architected as an encoder-decoder architecture where each of the encoder 505 and decoder 510 portions of the model each includes a plurality of layers of nodes.

Figure 9:
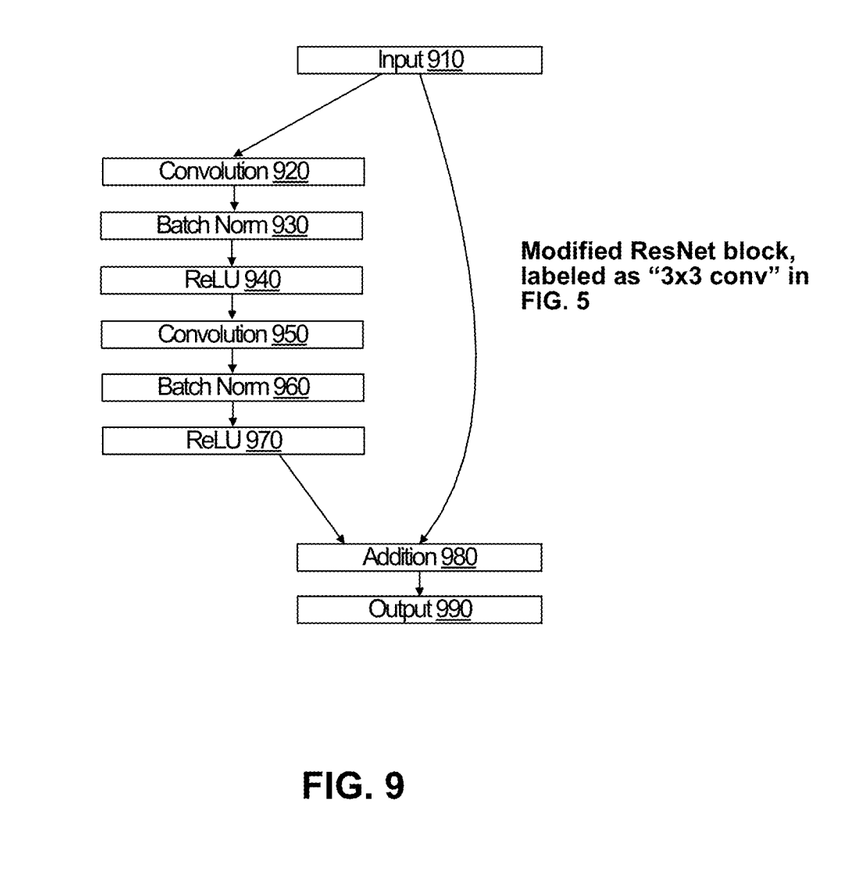
FIG. 9 illustrates a ResNet block used in accordance with one embodiment.

FIG. 9 illustrates an example ResNet block used by the encoder 505 layers in accordance with one embodiment. The encoder 505 in total includes a number of such modified ResNet blocks, labeled "3×3 conv". A Resnet encoder includes a number of blocks, each block including the same set of layers. The first Resnet block, Input 910, includes a split into a first branch comprising blocks 920-970 and second branch comprising blocks 980-990. Input 910 receives input from a prior layer. The first branch includes a first convolution layer 920, a first batch norm layer 930, a first ReLU layer 940, a second convolution layer 950, and a second batch norm layer 960. In a typical implementation of a Resnet block, the first branch joins back with a second branch as inputs to an addition layer, followed by a second ReLU layer. Other Resnet variants are also known, examples of which are available in "Identify Mappings in Deep Residual Networks" by Kaiming He, Xiangyu Zhang, Shaoqing Ren, and Jian Sun.

In the ResNet block shown in FIG. 9, rather than the second ReLU layer following the addition layer after the first branch joins with the second branch, the first branch includes a second ReLU layer 970 prior to rejoining the second branch at the addition layer 980. This allows full fusion of ReLU into convolution on mobile devices, which helps this architecture run faster than typical ResNet 18 implementations. An output layer 990 follows the addition 980.

Returning to the example FIG. 5, the ResNet blocks are modified from typical ResNet blocks to include half filters in every block. The model further comprises skip connections from encoder layers to the decoder layers for different feature map sizes. The model uses skip connections to simplify gradient flow from output layers to input layers, which leads to faster training and better generalization. Also using skip connections maintains more fine details from the original images which could otherwise be lost deeper inside another network architecture.

These skip connections connect selected layers in the decoder to selected layers in the encoder. In the illustrated example, the smallest feature map size (64×64) has its decoder output layers connected earlier in the sequence of encoder layers (in this example, between the 128 layers and the 256 layers), the next larger feature maps size (32×32) has its decoder output layers connected later in the sequence of encoder layers (between the 256 layers and the 512 layers), and so on for the largest 16×16 feature map size. Each set of ResNet encoder layers between each skip connection includes a downsampling layer, thus ensuring that the output of the appropriate layer on the encoder side is downsampled to the desired size from the decoder side.

The decoder layers are configured to upsample features output from the downsampled encoder layers in a fine grain manner. The decoder uses a block of layers referred to as a Linknet block: a first convolutional layer (1*1) (n to n/4), a 2× upsampling layer, a second convolutional layer (3*3) (n/4 to n/4), and a third convolutional layer (1*1) (n/4 to n). The Linknet block is used because it is fast as possible without losing too much information.

Further, FIG. 5 includes connections from the LinkNet blocks called (conv 3*3→k 64). The model uses these to decrease the number of filters and make them the same number, e.g., 64. These results are used in both detection and segmentation.

For segmentation, each of the connections also cause the upsampled layers to have the same feature map size for all features. After upsampling they go to concatenation to receive features from different levels of decoder concatenation. The output of this is convolved to get a smaller number of channels. The model's ultimate segmentation performance benefits from using features from objects of different scale. After convolution, the output has a feature map size of 128*128. The model uses bilinear sampling on the output to revert size to 512*512. After that, argmax is used to receive the resulting segmentation.

For detection, several convolutions (three in the example shown in FIG. 5) are used to transform features. The illustrated embodiment of FIG. 5 uses three feature map (fm) sizes: 512/8 (64×64 pixel) corresponding to object detection outputs loc1, cls1; 512/16 (32×32 pixel) corresponding to object detection outputs loc2, cls2; and 512/32 (16×16 pixel) corresponding to object detection outputs loc3, cls3.

Overall, the model's structure provides the ability to share a significant amount of computation and run detection and segmentation simultaneously at a processing power/time cost approximately equal to what would otherwise be used for segmentation alone. This also improves the overall quality of segmentation and detection because the shared features are more powerful because they see more data during model training.

Separately, the paired detector block head inputs for each feature map are passed into separate paired detector block heads to generate a set of object detections. Each paired detector blockhead outputs a pair of vectors, one having elements indicating locations in the image of detected objects (locx where x is an integer corresponding to one of the feature maps, 1=64×64="small" objects, 2=32×32="medium" objects, and 3=16×16="large" objects), and another having elements indicating the type of object in the image at the corresponding location in the location vector (clsx where x is as above).

The paired detector block heads include a number of convolutional layers. In the example embodiment of FIG. 5, the paired detector block heads have three convolutional layers (3*3).

VI. Example Use Cases for Vision Model

The trained vision model 115 may be used in a number of contexts.

Via. Updating Map Lane Information

Figure 7A:
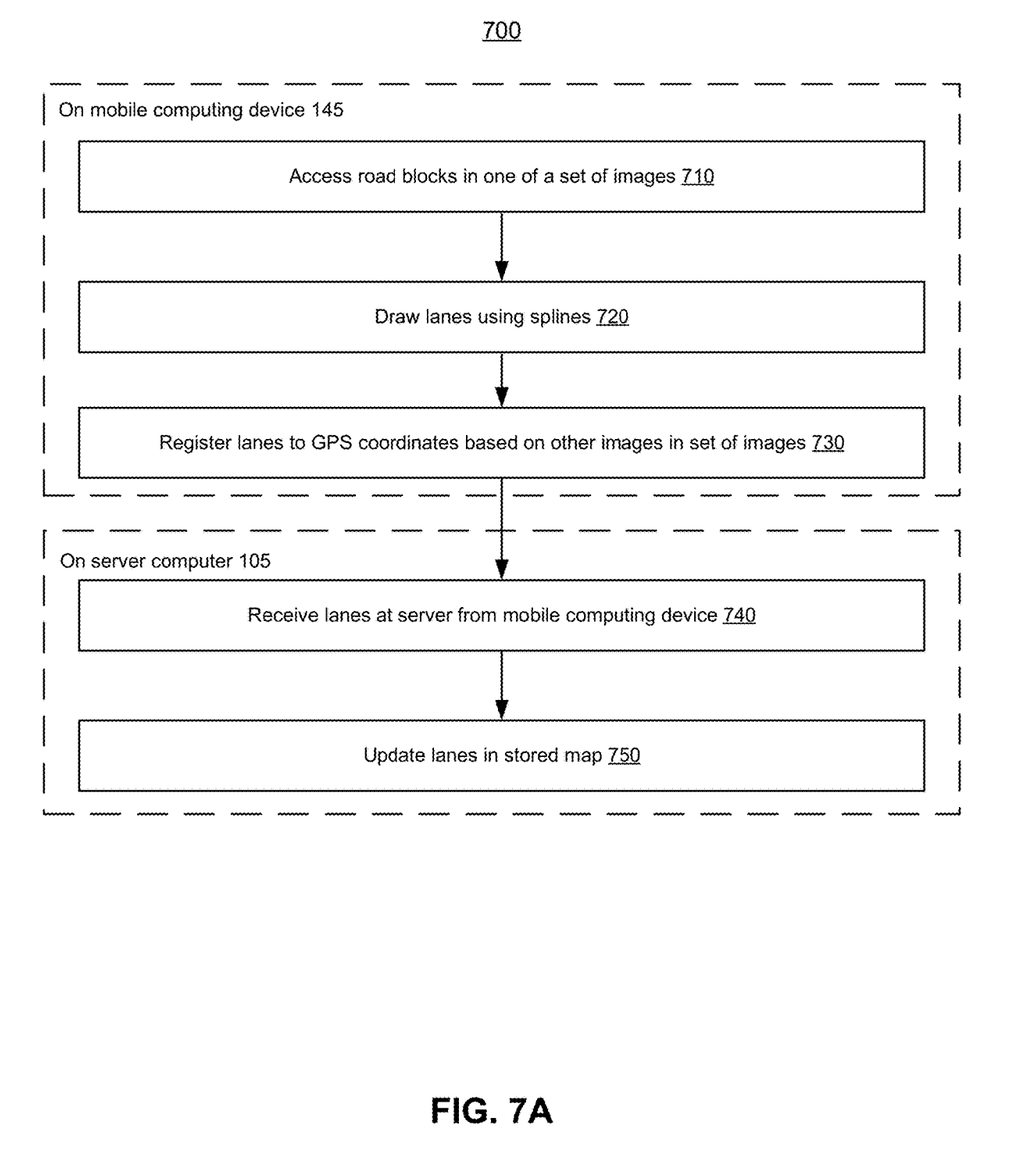
FIG. 7A is a flowchart for integrating live map data into an existing, external map repository, according to one embodiment.
Figure 7B:
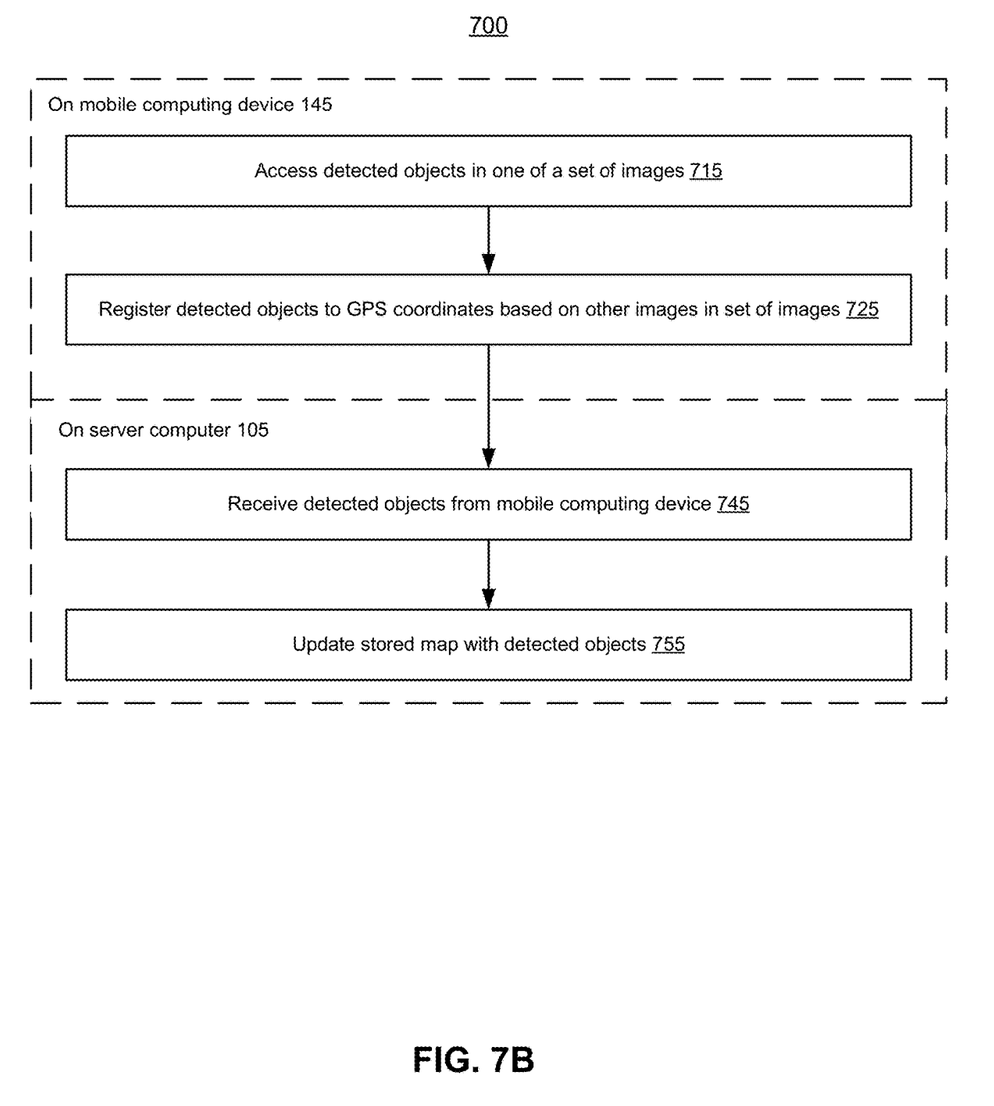
FIG. 7B is a flowchart for integrating live map data into an existing, external map repository, according to another embodiment.

FIGS. 7A and 7B are flowcharts for integrating live map data into an existing, external map repository, according to one embodiment. FIG. 7A pertains to the updating of mapped lane data on the server computer 105. Once the trained vision model 115 outputs segmented environment blocks 305, the client map application 155 on the mobile computing device 145 accesses 710 the segmented blocks, in one embodiment, that represent roads. The client map application 155 uses splines, in one embodiment, to draw lanes 720 along the pixel segmented road blocks. The drawn lanes are sent to the server computer 105. The mobile computing device 145 accesses the real-time location of the mobile computing device 145 via GPS coordinates and registers 730 the drawn lanes to the GPS coordinates based on other similar images in the set of live camera images taken in a particular time period to determine an updated tracing of the lanes of the map. The mobile computing device 145 sends this lane information to the server computer 105, and the server computer 105 receives 740 the lane information from the mobile computing device 145. The server computer 105 then updates the lanes 750 that are stored in an existing map repository. Although this description describes that particular tasks take place on the mobile computing device 145 and server computer 105, in other embodiments these tasks may be differently distributed between the two devices.

For example, in one embodiment, while driving on a street, over a five second period, the mobile computing device 145 may take a set of five separate images, i.e., "live images," with its camera. Each of the live images 425 taken in real-time is input into the trained vision model 115 and processed, outputting segmented environment blocks 305 and detected objects 310. Lanes are mathematically regressed to fit ("drawn" or "determined") with splines along segmented blocks classified as type "lane", "road", "lane line" or similar, on each of the live camera images within the set. The lanes in a single image are collapsed, compared, and/or adjusted against each other for accuracy, against lanes in all of the five live camera images in the set. The lanes are then registered to an external reference map using the positioned of the determined lanes and the mobile computing device's GPS position information associated with the geographic location of capture for each image.

The mapped lanes are then sent to the server computer 105, and the server computer 105 checks for discrepancies between mapped lanes and those in the existing map repository. Discrepancies may be identified in real time and addressed. In one embodiment, updating the map repository may include finding existing map data that shares similar GPS coordinates with the mapped lanes, checking for new or removed lanes at those locations, and then inputting new or updated lane data output by the trained vision model 115 into the map repository. Updating lane information for existing lanes includes adjusting the positions and contours of a lane based on newly provided data.

VI.B. Updating Map Road Object Information

Locations of road-related objects such as road signs can be added/updated/deleted in a manner similar to lanes. FIG. 7B pertains to the updating of maps of detected objects on the map server. The trained vision model 115 outputs detected objects 310 in a set of live camera images taken in a particular time period. The client map application 155 accesses 715 the detected objects in one of a set of images and registers 725 the GPS location of each image to the detected objects within each image based on the other images in the set of images, similar to the process explained with respect to FIG. 7A. When detected objects' presence and location have been verified across the set of images, the mobile computing device 145 sends the detected objects to the server computer 105, and the server computer 105 receives 745 data describing the detected objects from the mobile computing device 145. The server computer 105 updates 755 the stored map with the detected objects detected by the trained vision model 115.

In one embodiment, the set of live images 425 includes a detected object of a speed limit sign. The trained vision model 115 classifies the speed limit sign as an object. The GPS data for the set of images would be compared to verify the location of the speed limit sign. The existing map repository is then checked for a speed limit sign at the location it was detected. If there are discrepancies between the client map application's classified speed limit sign and that in the existing map repository, the server computer 105 updates a stored database of map information in real time.

VI.C. Real Time Object Notifications

In response to a number of rules stored in the memory of the mobile computing device 145, the client map application 155 may notify users either by visual notification or audio alert via the screen or speaker of the mobile computing device 145, respectively. Rules triggering user notifications may depend on data, such as GPS location, collected from the mobile computing device 145, on which the client map application 155 is running.

In one embodiment, the client map application 155 or vision application 110 might determine that one or more of the segmented environment blocks 305 and/or detected objects 310 output by trained vision model 115 are hazardous. The client map application 155 may automatically warn the user when their vehicle is within a detected distance from the hazard.

In another embodiment, the trained vision model 115 outputs segmented environment blocks 305 and detected objects 310 that the vision application 110 or client map application 155 determines to be indicative of a location or destination. For example, the vision application 110 might use GPS data collected by and received from the mobile computing device 145 to verify the accuracy of the detected environment and objects about the vehicle. The vision application 110 might also access authorized information, such as a user's destination or waypoint, from the client map application 155 running concurrently on the mobile computing device 145. The client map application 155 may instruct the client map application 155 to notify users of their proximity to their destination or waypoint, as determined by the vision application 110.

For example, a user, whose mobile computing device 145 hosts the client map application 155, driving through Seattle might input their destination as the Space Needle into the client map application 155. When their vehicle nears the Space Needle, the trained vision model 115 classifies the Space Needle as an object, which the vision application 110 or client map application 155 determines as an indicator that the user is nearing their destination. The vision application 110 or client map application 155 confirms that the GPS location of the mobile computing device 145 is indeed near the Space Needle, and then the client map application 155 notifies the user that they have arrived at their destination.

In another embodiment, users of the client map application 155 may set the rules that result in notifications. For example, a user may choose to be notified when the trained vision model 115 classifies an object as a stop sign ahead of the vehicle.

VII. Additional Considerations

Figure 8:
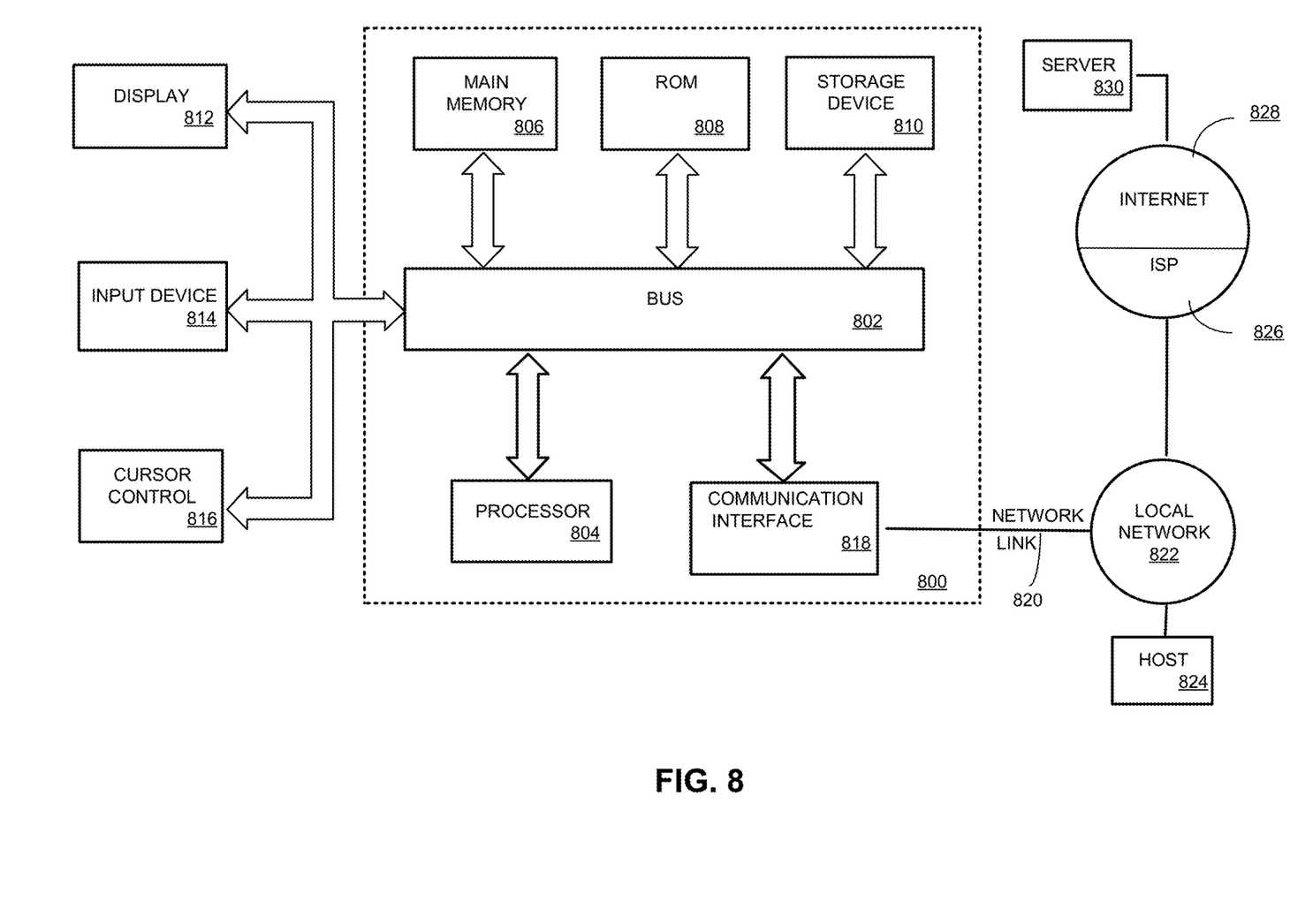
FIG. 8 illustrates an example computer system upon which embodiments may be implemented.

FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Example computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a LCD screen, LED screen, or touch screen, for displaying information to a computer user. An input device 814, which may include alphanumeric and other keys, buttons, a mouse, a touchscreen, or other input elements is coupled to bus 802 for communicating information and command selections to processor 804. In some embodiments, the computer system 800 may also include a cursor control 816, such as a mouse, a trackball, or cursor direction keys for communicating direction information and command selections to processor 804 and for controlling cursor movement on display 812. The cursor control 816 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and stored in storage device 810, or other non-volatile storage for later execution.

What is claimed is:

1. A method to be performed by a computing device comprising:
   receiving an image from a camera;
   inputting the image into a convolution model loaded into a memory of the computing device and configured to generate a set of object detections for objects appearing in the received image and a set of segmented environment blocks, the convolution model comprising:
   a plurality of parameters associated with a plurality of layers of the convolution model, the layers comprising a subset of encoding layers and a subset of decoding layers, with at least one skip connection between the encoding layers and the decoding layers;
   a function relating the image and the parameters to the set of object detections and the set of segmented environment blocks; and
   providing the set of object detections and the set of segmented environment blocks to a server computing device.

2. The method of claim 1, wherein the subset of decoding layers further comprises a set of paired detector block heads for generating object detections of a large size.

3. The method of claim 1, wherein the subset of decoding layers further comprises a linknet block and a set of paired detector head blocks for generating object detections of a medium size.

4. The method of claim 1, wherein the subset of decoding layers further comprises a linknet block and a set of paired detector head blocks for generating object detections of a small size.

5. The method of claim 1, wherein the subset of decoding layers further comprises a linknet block and at least one up-sampling layer to generate the set of segmented environment blocks.

6. The method of claim 1, wherein the objects identified in the set of object detections are physically located in the environment and are captured within the image by the camera, wherein:
the objects comprise discrete shapes around which bounding boxes can be placed,
the objects are represented by a number of pixels located in the image, and
the objects are one of a plurality of object types.

7. The method of claim 1, wherein the segmented environment blocks identified in the set of segmented environment blocks are physically located in the environment and are captured within the image by the camera, wherein:
the segmented environment blocks comprise unbounded shapes, including those behind or crossing one or more of the objects,
the segmented environment blocks are represented by a number of pixels located in the image, and
the segmented environment blocks are one of a plurality of block types.

8. The method of claim 1, wherein the parameters were obtained using a set of training images, each training image associated with a set of training object detections and a set of training segmented environment blocks.

9. The method of claim 1, wherein the encoding layers each comprise at least one resnet block.

10. The method of claim 1, wherein the decoding layers further comprise a linknet block, the linknet block comprising:
a first convolution layer;
an upsampling layer;
a second convolution layer; and
a third convolution layer.

11. The method of claim 1, further comprising:
responsive to determining that one of the identified set of object detections adheres to a set of rules loaded into the memory of the computing device, providing a notification via the mobile computing device to a user.

12. The method of claim 11, wherein the rule indicates that a road hazard has been detected within a proximity of a vehicle and wherein the notification informs the user of the road hazard.

13. The method of claim 11, wherein the rule indicates that a waypoint or a destination has been detected within a proximity of a vehicle and wherein the notification informs a user of the presence of the waypoint or the destination.

14. The method of claim 1, wherein the computing device is a mobile computing device.

15. A non-transitory computer-readable storage medium of a computing device storing instructions that, when executed by a computer processor of the computing device cause the computing device to:
input an image into a convolution model loaded into a memory of the computing device and configured to generate a set of object detections for objects appearing in the image and a set of segmented environment blocks, the convolution model comprising:
a plurality of parameters associated with a plurality of layers of the convolution model, the layers comprising a subset of encoding layers and a subset of decoding layers, with at least one skip connection between the encoding layers and the decoding layers;
a function relating the image and the parameters to the set of object detections and the set of segmented environment blocks; and
provide the set of object detections and the set of segmented environment blocks to a server computing device.

16. The computer-readable storage medium of claim 15, wherein the subset of decoding layers further comprises a set of paired detector block heads for generating object detections of a large size.

17. The computer-readable storage medium of claim 15, wherein the subset of decoding layers further comprises a linknet block and a set of paired detector head blocks for generating object detections of a medium size.

18. The computer-readable storage medium of claim 15, wherein the subset of decoding layers further comprises a linknet block and a set of paired detector head blocks for generating object detections of a small size.

19. The computer-readable storage medium of claim 15, wherein the subset of decoding layers further comprises a linknet block and at least one up-sampling layer to generate the set of segmented environment blocks.

20. The computer-readable storage medium of claim 15, wherein the objects identified in the set of object detections are physically located in an environment and are captured within the image by a camera, wherein:
the objects comprise discrete shapes around which bounding boxes can be placed,
the objects are represented by a number of pixels located in the image, and
the objects are one of a plurality of object types.

* * * * *